United States Patent [19]
Nakamura et al.

[11] Patent Number: 5,724,109
[45] Date of Patent: Mar. 3, 1998

[54] LIQUID CRYSTAL DISPLAY PANEL WITH ELECTRODES OR A PASSIVATION LAYER INTERMEDIATE TWO LIQUID CRYSTAL LAYERS

[75] Inventors: Kimiaki Nakamura; Hidefumi Yoshida; Kazutaka Hanaoka; Hideaki Tsuda; Hideo Chida; Takahiro Sasaki, all of Kawasaki, Japan

[73] Assignee: Fujitsu Limited, Kawasaki, Japan

[21] Appl. No.: 522,580

[22] Filed: Sep. 1, 1995

Related U.S. Application Data

[63] Continuation-in-part of Ser. No. 123,858, Sep. 17, 1993, Pat. No. 5,508,831.

[30] Foreign Application Priority Data

| Sep. 17, 1992 | [JP] | Japan | 4-248022 |
| Sep. 14, 1993 | [JP] | Japan | 5-228882 |
| Jun. 22, 1995 | [JP] | Japan | 7-155805 |

[51] Int. Cl.$^6$ ............ G02F 1/1347; G02F 1/1333; G02F 1/1335; C09K 19/02
[52] U.S. Cl. ............ 349/79; 349/86; 349/103; 349/108; 349/176
[58] Field of Search ............ 349/74, 78, 79, 349/83, 86, 106, 108, 139, 143, 147, 155, 176

[56] References Cited

U.S. PATENT DOCUMENTS

| 3,936,930 | 2/1976 | Stern | 349/155 |
| 4,610,507 | 9/1986 | Kamamori et al. | 359/53 |
| 4,877,309 | 10/1989 | Takamatsu | 359/68 |
| 4,886,343 | 12/1989 | Johnson | 359/53 |
| 4,953,953 | 9/1990 | Fergason | 359/53 |
| 5,047,576 | 9/1991 | Takenosita et al. | 560/125 |
| 5,194,973 | 3/1993 | Isogai et al. | 359/51 |
| 5,317,431 | 5/1994 | Yoshida et al. | 359/53 |

FOREIGN PATENT DOCUMENTS

| 4-284418 | 10/1992 | Japan | 359/62 |

*Primary Examiner*—William L. Sikes
*Assistant Examiner*—Walter Malinowski
*Attorney, Agent, or Firm*—Staas & Halsey

[57] ABSTRACT

A liquid crystal display panel including at least two liquid crystal layers, and a color filter having two color portions. One of the liquid crystal layers includes solid regions and liquid crystal dispersing regions arranged adjacent to the solid regions. Picture electrodes are arranged on the first plate, on the liquid crystal dispersing regions, and on the solid regions, at positions corresponding to the color portions of the color filter. A common electrode is arranged on the second plate. The picture elements on the liquid crystal dispersing regions and on the solid regions are connected to the conductors on the first plate by connecting members extending through the solid regions. Therefore, the liquid crystal layers can be independently controlled.

21 Claims, 9 Drawing Sheets

LIQUID CRYSTAL DISPLAY PANEL WITH ELECTRODES OR A PASSIVATION LAYER INTERMEDIATE TWO LIQUID CRYSTAL LAYERS

CROSS REFERENCE TO RELATED APPLICATION

This application is a continuation-in-part application of Ser. No. 08/123,858 filed on Sep. 17, 1993 and issued Apr. 16, 1996 as U.S. Pat. No. 5,508,831 and having a common assignee herewith.

BACKGROUND OF THE INVENTION

1. Field of the Invention

The present invention relates to a liquid crystal display panel having a plurality of liquid crystal layers and affording a multi-color display.

2. Description of the Related Art

With recent developments in liquid crystal display devices, a color display can be realized with less power consumption. To realize a color liquid crystal display device, one solution is to provide a color filter having red, blue and green color portions, and another is to include a plurality of liquid crystal layers having dichromatic dyes added thereto.

In the case where a color filter having red, blue and green color portions is used, one pixel area is divided into respective regions each occupying one third of the area, and the efficiency of utilized light is low. In order to increase the efficiency of utilized light, a liquid crystal display device including a plurality of liquid crystal layers and in which one pixel region is divided into a smaller number of regions, is desired. To satisfy this requirement, the above U.S. Pat. No. 5,508,831 proposes a liquid crystal display device including a color filter having two color portions for one pixel area comprising two respective liquid crystal layers having corresponding different dichroic dyes added thereto.

In the case where a display panel structure of two liquid crystal layers having dichroic dyes added thereto is used, the simplest arrangement is where there is one liquid crystal panel comprising a first liquid crystal layer held between a first pair of transparent plates and another liquid crystal panel comprising a second liquid crystal layer held between a second pair of transparent plates, with the two liquid crystal panels superposed on one another. However, in this case, two transparent plates exist between the first and second liquid crystal layers, and the distance between the first and second liquid crystal layers becomes greater so that it is difficult to produce a clear image.

Therefore, the above described application proposes that first and second liquid crystal layers are stratified, one above another, and arranged close to each other between a pair of glass plates. Electrodes are arranged on these glass plates. The first and second liquid crystal layers have respective threshold voltages so that, with an increase of the applied voltage, the color of the first liquid crystal layer appears, the first liquid crystal layer is then brought into the transparent state and the color of the second liquid crystal layer appears, and the first and second liquid crystal layers are then brought into the transparent state and the color of the color filter appears, to thereby realize a multi-color display.

However, it is not possible to independently control the first and second liquid crystal layers, and the available colors are limited. Therefore, the above described application further proposes that an intermediate electrode layer is arranged between the first and second liquid crystal layers so that it is possible to independently control the first and second liquid crystal layers, and thus many colors can be available.

However, since a glass plate does not exist between the first and second liquid crystal layers, it is not easy to arrange an intermediate electrode layer between the first and second liquid crystal layers. To this end, the above described application proposes that a polymer dispersed type liquid crystal is used for one of the first and second liquid crystal layers, for example, a layer that is located below the other layer, such that the intermediate electrode layer is arranged on the surface of the polymer dispersed type liquid crystal and through holes are provided in the polymer dispersed type liquid crystal to electrically connect the intermediate electrode layer on the surface of the polymer dispersed type liquid crystal to conductors on the surface of a glass plate located below the polymer dispersed type liquid crystal. The conductors are connected to bus lines of an active matrix.

However, the polymer dispersed type liquid crystal comprises a polymer and a liquid crystal material dispersed in the polymer, wherein the liquid crystal material is in the form of capsules or droplets of liquid crystal molecules in a substantially liquid state which are dispersed in the solid polymer. Therefore, if through holes are provided in the polymer dispersed type liquid crystal, the cross-sectional shape of the through holes becomes irregular and it is difficult to establish a reliable electrical connection between the intermediate electrode layer and the conductor on the glass plate.

SUMMARY OF THE INVENTION

The object of the present invention is to provide a liquid crystal display panel comprising a plurality of liquid crystal layers, an electrode layer between the liquid crystal layers, and connecting members by which a reliable electrical connection can be established.

According to the present invention, there is provided a liquid crystal display panel comprising first and second opposing plates, the first plate having conductors and electrodes, at least two liquid crystal layers arranged between the first and second plates, the liquid crystal layer located near the first plate including a plurality of solid regions without liquid crystal arranged along the first plate and a plurality of liquid crystal dispersing regions arranged adjacent to the solid regions, electrodes arranged on surfaces of the liquid crystal dispersing regions in an opposing relationship with the electrodes on the first plate, and connecting members extending through the solid regions for connecting the electrodes on the liquid crystal dispersing regions to the conductors on the first plate, respectively.

In this arrangement, the liquid crystal layer located near the first plate includes solid regions without liquid crystal arranged along the first plate and liquid crystal dispersing regions arranged adjacent to the solid regions. When through holes are formed in the solid regions for passing through the connecting members, the surface of the solid regions can be made smooth since the solid regions do not include liquid crystal. Therefore, the connecting members uniformly extend through the solid regions and connect the electrodes on the liquid crystal dispersing regions to the conductors on the first plate. Therefore, it is possible to establish a reliable electrical connection.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
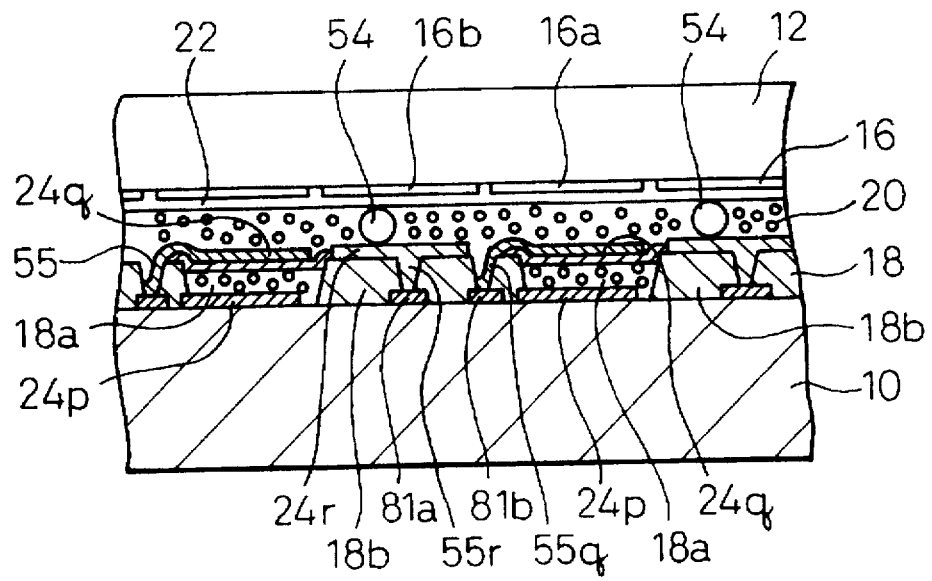
FIG. 1 is a cross-sectional view of the liquid crystal display device according to the first embodiment of the present invention.
Figure 2:
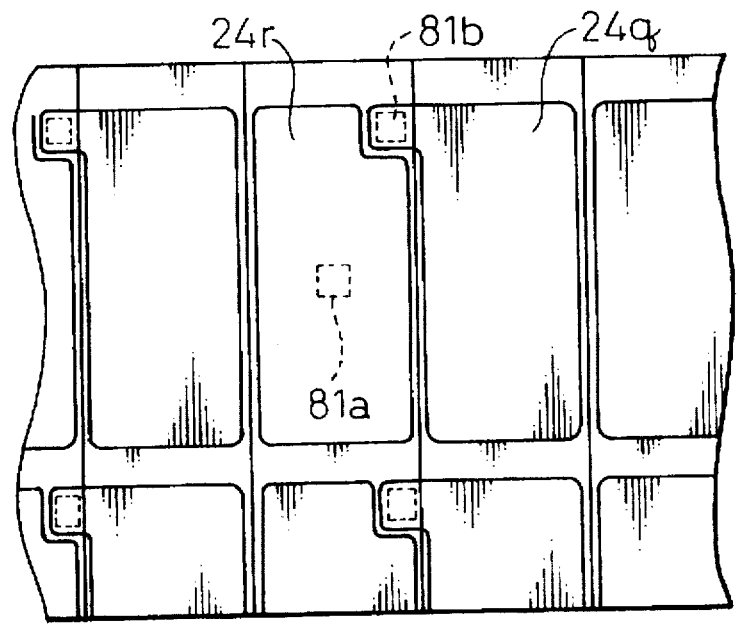
FIG. 2 is a plan view of the intermediate electrodes of FIG. 1.
Figure 3:
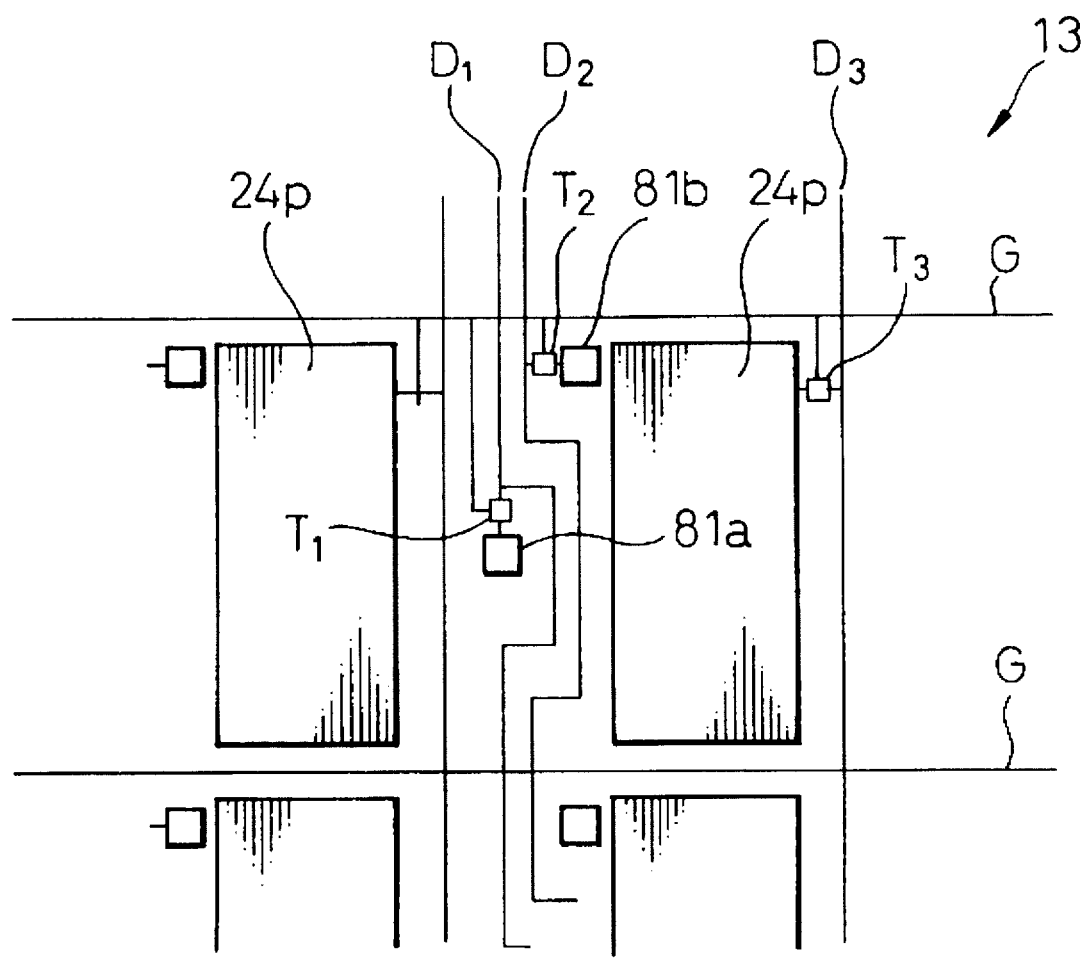
FIG. 3 is a plan view of the electrodes and the active matrix on the first plate of FIG. 1.

Referring to FIGS. 1 to 3, the liquid crystal display panel according to the first embodiment of the present invention comprises first and second opposed transparent glass plates 10 and 12, and first and second liquid crystal layers 18 and 20 arranged between the plates 10 and 12. Dichroic dyes having different colors are added to liquid crystals in the first and second liquid crystal layers 18 and 20.

The liquid crystal layer 18 located near the first plate 10 includes a plurality of solid regions 18b without liquid crystal arranged along the first plate 10 and a plurality of liquid crystal dispersing regions 18a arranged adjacent to the solid regions 18b. The liquid crystal dispersing regions 18a comprise a polymer dispersed type liquid crystal. In addition, the liquid crystal layer 20 located near the second plate 12 generally comprises a polymer dispersed type liquid crystal.

The polymer dispersed type liquid crystal comprises capsules or droplets of liquid crystal dispersed in a polymer; liquid crystal molecules are randomly distributed in the capsules of liquid crystal, as is well known. When no voltage is applied to the liquid crystal layer, light made incident to the first and second liquid crystal layers 18 and 20 is absorbed by the dichroic dyes to provide respective colors. When the voltage is applied to the liquid crystal layer, light made incident to the liquid crystal display panel passes through the liquid crystal and the dichroic dye and the first and second liquid crystal layers 18 and 20 become substantially transparent. Preferably, the polymer of the second liquid crystal layer 20 is softer than the polymer of the first liquid crystal layer 18. In addition, spacers 54 are selectively arranged in the second liquid crystal layer 20 at positions corresponding to solid regions 18b.

The first plate 10 has picture electrodes 24p and an active matrix drive circuit on the inner side of the plate 10, as shown in FIG. 3. The active matrix drive circuit comprises thin film transistors (TFT) $T_1$, $T_2$, and $T_3$, drain bus lines $D_1$, $D_2$, and $D_3$, and gate bus lines G. The transistors (TFT) $T_1$, $T_2$, and $T_3$ are arranged on the first plate 10 at positions covered by reflective picture electrodes 24r provided on the solid regions 18b (FIG. 2).

The second plate 12 has a color filter 16 having two different color portions 16a and 16b for one pixel, and a common electrode 22, as shown in FIG. 1. The liquid crystal dispersing region 18a and the solid region 18b of the first liquid crystal layer 18 are arranged at positions corresponding to the color portions 16a and 16b of the color filter, and a pair of liquid crystal dispersing region 18a and solid region 18b, as well as a pair of color portions 16a and 16b correspond to one pixel. In addition, intermediate picture electrodes 24q and 24r are arranged between the first and second liquid crystal layers 18 and 20.

The picture electrodes 24q are arranged on the surfaces of the liquid crystal dispersing regions 18a in an opposite relationship with the picture electrodes 24p on the first plate 10 and also with the first color portions 16a of the color filter 16. The picture electrodes 24p on the first plate 10 are reflective electrodes. The picture electrodes 24q are transparent electrodes and are connected to the conductors 81b on the first plate 10 by connecting members 55q extending through the solid regions 18b of the first liquid crystal layer 18.

The picture electrodes 24r are arranged on the surfaces of the solid regions 18b in an opposite relationship with the second color portions 16b of the color filter 16. The picture electrodes 24r are reflective electrodes and are connected to the conductors 81a on the first plate 10 by connecting members 55r extending through the solid regions 18b of the first liquid crystal layer 18.

The positions of the conductors 81a and 81b are shown in FIGS. 2 and 3. The transistor $T_1$ is connected to the drain bus line $D_1$, the gate bus line G, and the conductor 81a for driving the picture electrode 24r on the solid region 18b. The transistor $T_2$ is connected to the drain bus line $D_2$, the gate bus line G, and the conductor 81b for driving the picture electrode 24q on the liquid crystal dispersing region 18a. The transistor $T_3$ is connected to the drain bus line $D_3$, the gate bus line G, and the picture electrode 24p for driving the picture electrode 24p. In this way, the liquid crystal layers 18 and 20 can be independently driven so that a color display including many colors can be realized.

For example, when the color of the first color portions 16a is yellow and the color of the second color portions 16b is blue, and the color of the dichroic dye in the first liquid crystal layer 18 is cyan and the color of the dichroic dye in the second liquid crystal layer 20 is red, the following colors can be realized for one pixel. "T" represents a transmitting state and "A" represents an absorbing state.

| COLOR PORTION 18B BLUE | COLOR PORTION 18A YELLOW | | COLOR |
|---|---|---|---|
| LCD LAYER 20 RED | LCD LAYER 20 RED | LCD LAYER 18 CYAN | OF DISPLAY |
| A | A | A | BLACK |
| A | T | A | GREEN |
| T | A | A | BLUE |
| A | A | T | RED |

The advisable combination of colors can be expressed in a general form as follows. That is, the dichroic dye of the first liquid crystal layer 18 is a color selected from the group of yellow, magenta and cyan; the dichroic dye of the second liquid crystal layer 20 is a complementary color of the color of the first liquid crystal layer 18; the color of the first color portions 16a is color selected from the group of yellow, magenta and cyan except for the color of the first liquid crystal layer 18; and the color of the second color portions 16b is a complementary color of the color of the first color portions 16a.

Alternatively, it is possible to realize a color display having many colors, by using picture electrodes 24p and 24r which are treated to absorb light, rather than the reflective electrodes, and a cholesteric liquid crystal material having a selective reflective spectrum of a color for the first and second liquid crystal layers 18 and 20.

In this case, the first liquid crystal layer 18 includes a cholesteric liquid crystal material having a selective reflective spectrum selected from the group of red, blue and green; the second liquid crystal layer 20 includes a cholesteric liquid crystal material having a selective reflective spectrum of a complementary color of the color of the first liquid crystal layer 18; the color of the first color portions 16a is one of the colors selected from the group of yellow, magenta and cyan which allows light of the selective reflective spectrum of the cholesteric liquid crystal material in the first liquid crystal layer 18; and the color of the second color portions 16b is a complementary color of the color of the first color portions 16a.

For example, the first liquid crystal layer 18 includes a cholesteric liquid crystal material having a selective reflective spectrum of blue, the second liquid crystal layer 20 includes a cholesteric liquid crystal material having a selective reflective spectrum of yellow, the color of the first color portions 16a is cyan, and the color of the second color portions 16b is red.

Figure 4A:
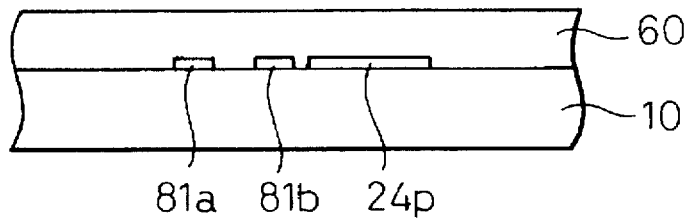
FIGS. 4A to 4H are views illustrating an example of the process for fabricating the liquid crystal display device of FIG. 1.
Figure 4B:
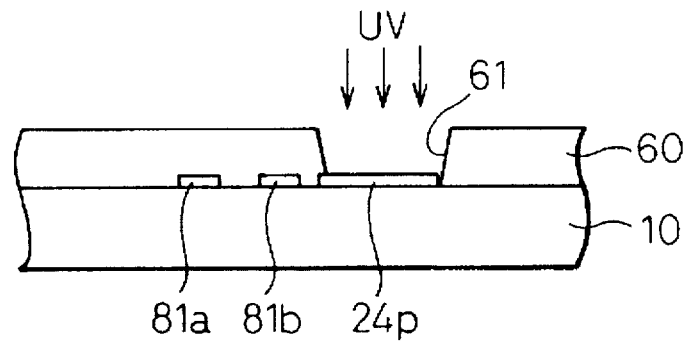

FIGS. 4A to 4H are views illustrating an example of the process for fabricating the liquid crystal display device of FIGS. 1 to 3. A positive type resist 60 having the thickness of 8 μm is applied to the surface of the first plate 10 by a spin coater, after the picture electrodes 24p and the conductors 81a and 81b as well as the active matrix drive circuit are formed on the surface of the first plate 10, as shown in FIG. 4A. The resist 60 is selectively irradiated with an ultraviolet light, using a mask (not shown) having openings at positions where the liquid crystal dispersing regions 18a of the first liquid crystal layers 18 are to be formed, in order to form apertures 61 in the mask at positions corresponding to the liquid crystal dispersing regions 18a, as shown in FIG. 4B.

Figure 4C:
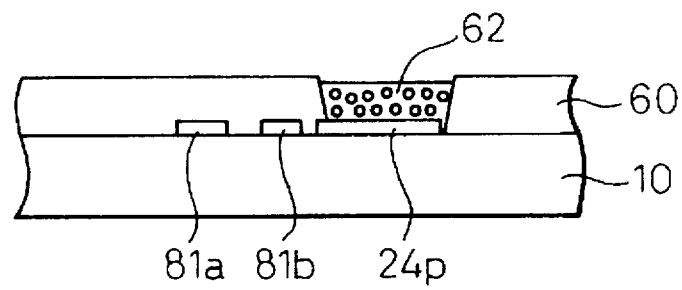

A mixture for the polymer dispersed type liquid crystal is prepared, by mixing a liquid crystal material such as MERCK ZLI-4792 with anthraquinone cyan dye dissolved therein in a PVA solution such as Kurare PVA-205 of 20 percent by weight, and the mixture is emulsified by a homogenizer. The mixture is applied to the first plate 10 by a screen printing method to fill the apertures 61 in the mask with the mixture, for example, as shown in FIG. 4C. The polymer in the mixture becomes hardened by the evaporation of water contained therein, and the polymer dispersed type liquid crystal 62 is arranged in the apertures 61. Alternatively, it is possible to use another type of the polymer dispersed type liquid crystal 62, for example, it is possible to make a polymer dispersed type liquid crystal 62 from a solution of a liquid crystal material, a polymerization initiator and an acrylate group prepolymer. In this case, polymerization occurs by applying heat or an ultraviolet light and the polymer is hardened, causing a phase separation between the polymer and the capsules of liquid crystal.

The polymer dispersed type liquid crystal 62 in the apertures 61 forms the liquid crystal dispersing regions 18a, and portions of the resist 60 around the liquid crystal dispersing regions 18a form the solid regions 18b.

Figure 4D:
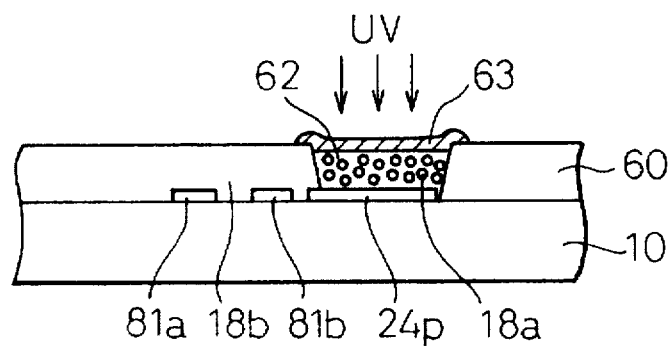

A passivation layer 63 is arranged on each of the liquid crystal dispersing regions 18a. The passivation layer 63 is formed from an acrylate group polymer polymerized by the application of an ultraviolet light and having the thickness of approximately 1 μm, as shown in FIG. 4D.

Figure 4E:
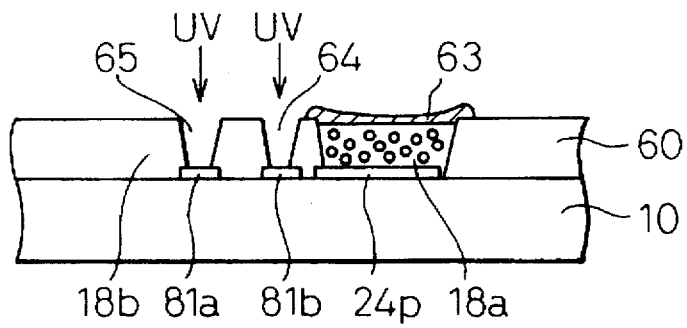

Through holes 64 and 65 are then formed in the resist 64, by selectively applying an ultraviolet light using a mask (not shown), as shown in FIG. 4E.

Figure 4F:
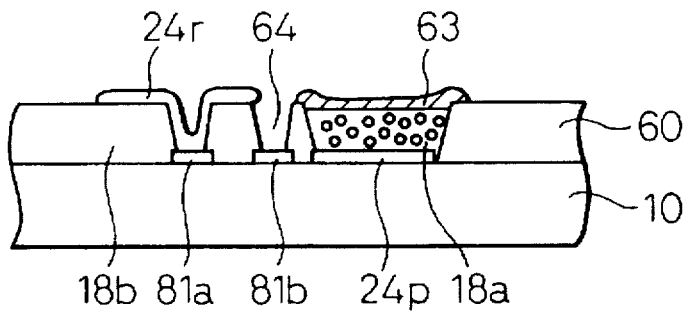

Aluminum is deposited under a vacuum environment on the resist 60 at the solid regions 18b to form the reflective electrodes 24r, as shown in FIG. 4F. Aluminum also enters each of the through holes 65 and becomes the conductor which passes through the hole in the solid region 18b for connecting the reflective electrode 24r to the conductor 81a on the first plate 10.

Figure 4G:
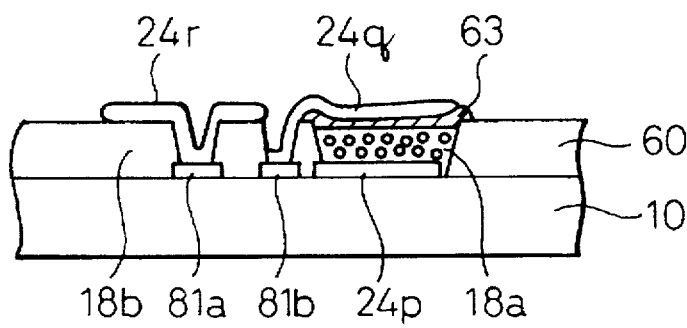

A transparent material such as ITO is deposited under a vacuum environment on the passivation layer 63 arranged on the liquid crystal dispersing region 18a to form the transparent electrode 24q, as shown in FIG. 4G. This transparent electrode material also enters each of the through holes 64 and forms the conductor 55q which passes through the solid region 19b for connecting the transparent electrode 24q to the conductor 81b on the first plate 10.

Figure 4H:
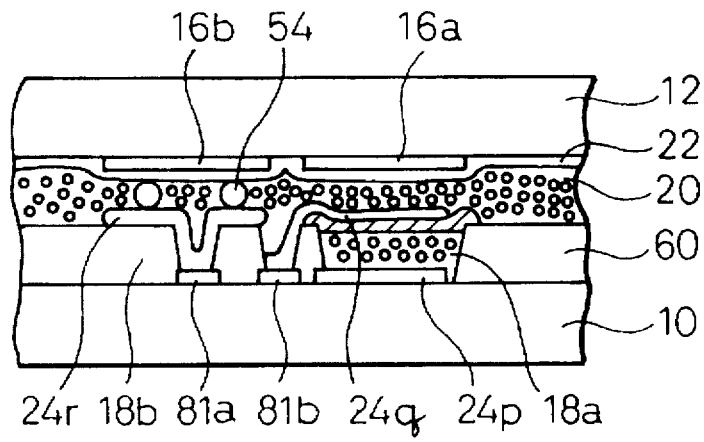

As shown in FIG. 4H, the second plate 12 having the color filter 16 with the different color portions 16a and 16b and the common electrode 22 is prepared, and the second liquid crystal layer 20 comprising a polymer dispersed liquid crystal is formed on the second plate 12. The second plate 12 is then put on the first plate 10, and the liquid crystal display panel of FIG. 1 is completed.

The solid regions 18b surround the liquid crystal dispersing regions, and it is possible to increase the mechanical strength of the first liquid crystal layer 18 by the provision of the solid regions 18b. In addition, since the spacers 54 are selectively arranged in the second liquid crystal layer 20 at positions corresponding to the solid regions 18b, it is ensured that the liquid crystal display panel has a uniform thickness.

Figure 5A:
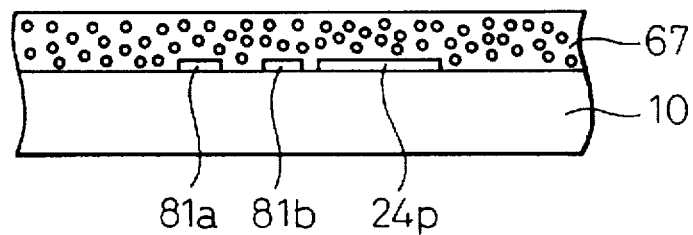
FIGS. 5A to 5D are views illustrating another example of the process of fabricating the liquid crystal display device of FIG. 1.

FIGS. 5A to 5D show another example of the process for fabricating the liquid crystal display device of FIGS. 1 to 3. A polymer dispersed liquid crystal 67 is formed on the first plate 10, after the picture electrodes 24p, and the conductors 81a and 81b as well as the active matrix drive circuit are formed on the surface of the first plate 10, as shown in FIG. 5A.

Figure 5B:
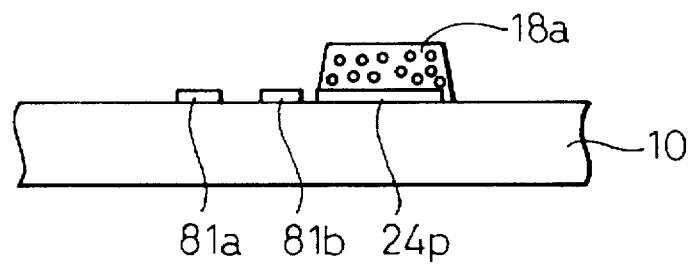

The polymer dispersed liquid crystal 67 is patterned, using a resist or a light sensitive PVA such as Sanyo Chemistry BMR-200, and portions of the polymer dispersed liquid crystal 67 are removed except for portions which become the liquid crystal dispersing regions 18a, as shown in FIG. 5B.

Figure 5C:
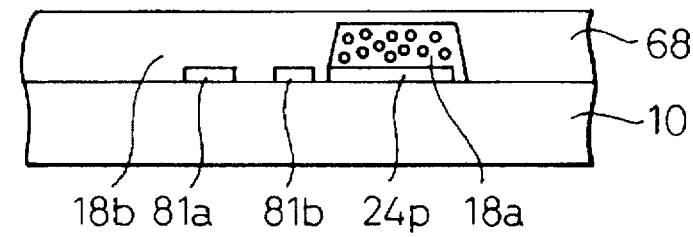
Figure 5D:
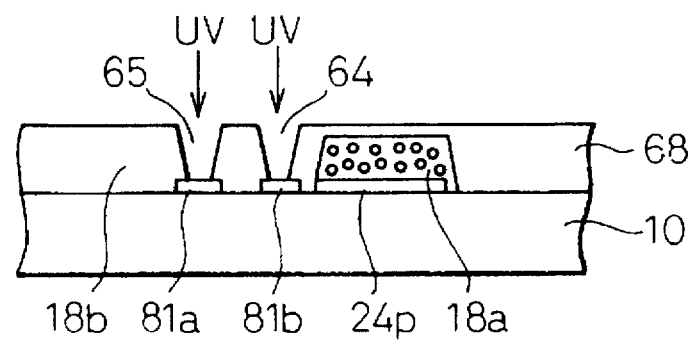

A resist 68 having a flattening property such as Sanyo Chemistry S-1000 is coated on the first plate 10, to form the solid regions 18b adjacent to the liquid crystal, as shown in FIG. 5C. Through holes 64 and 65 are formed in the resist 68, by selectively applying an ultraviolet light, as shown in FIG. 5D. After the through holes 64 and 65 are formed, the liquid crystal display panel can be completed in an identical manner to the process of FIGS. 4F to 4H.

Figure 6A:
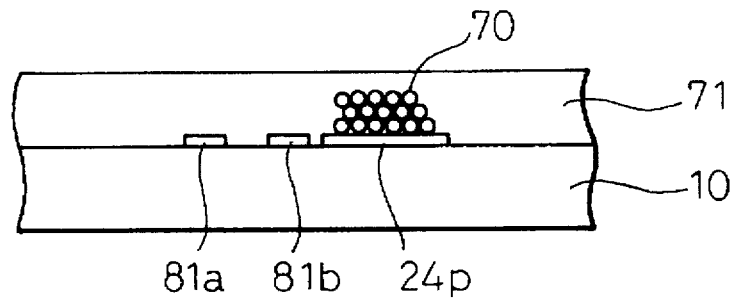
FIGS. 6A to 6C are views illustrating a further example of the process for fabricating the liquid crystal display device of FIG. 1.
Figure 6B:
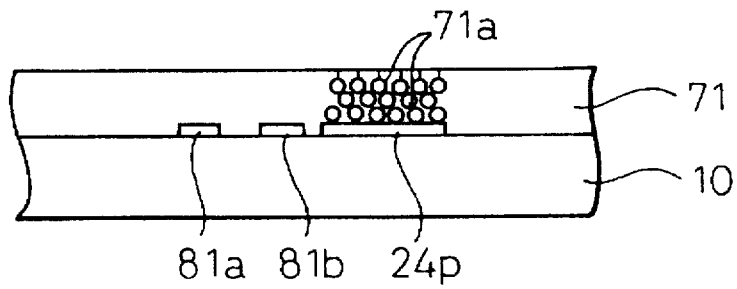
Figure 6C:
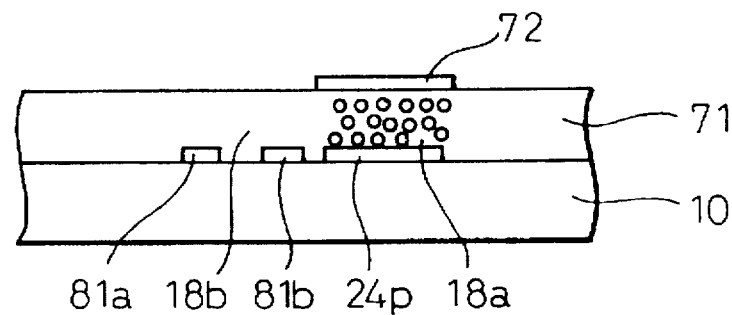

FIGS. 6A to 6C show a further example of the process for fabricating the liquid crystal display device of FIGS. 1 to 3.

Small particles 70 of PVA having the diameter of 2 to 3 μm are arranged on the first plate 10 at positions where the liquid crystal dispersing regions 18a of the first liquid crystal layer 18 should be arranged, after the picture electrodes 24p and the conductors 81a and 81b as well as the active matrix drive circuit are formed on the surface of the first plate 10, as shown in FIG. 6A. A resist 71 is then coated on the first plate 10 by a spin coater.

The small particles 70 of PVA are then extracted from the resist 71 to the outside by water or solvent which soaks through the resist 71, as shown in FIG. 6B. Cavities 71a are formed in the resist 70 at positions where the small particles 70 of PVA are positioned.

A polymer dispersed liquid crystal is inserted in the cavities 71a of the resist 71 in a vacuum environment, to form the liquid crystal dispersing regions 18a of the first liquid crystal layer 18, as shown in FIG. 6C. At the same time, the solid regions 18b are formed adjacent to the liquid crystal dispersing regions 18a. A passivation layer 72 is arranged on the liquid crystal dispersing regions 18a. Then, the through holes 64 and 65 are formed in the solid regions 18b, the picture electrodes 24r and 24q are formed, and the two plates 10 and 12 are superposed one on another, to complete the liquid crystal display panel, in an identical manner to the process of FIGS. 4E to 4H.

Figure 7A:
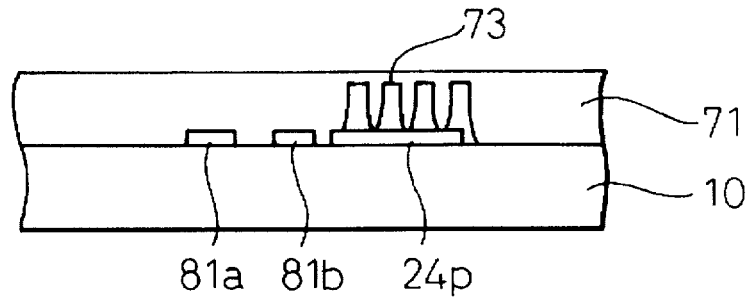
FIGS. 7A to 7C are views illustrating a further example of the process for fabricating the liquid crystal display device of FIG. 1.
Figure 7B:
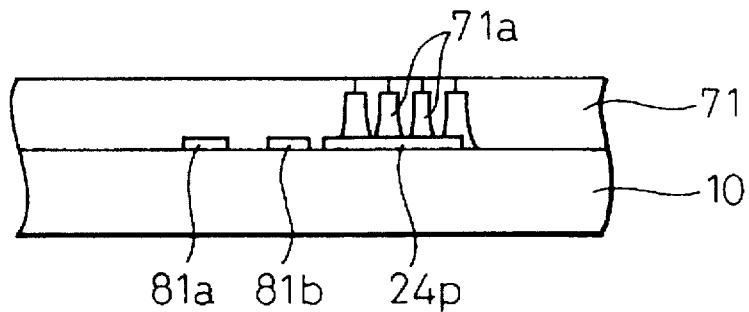
Figure 7C:
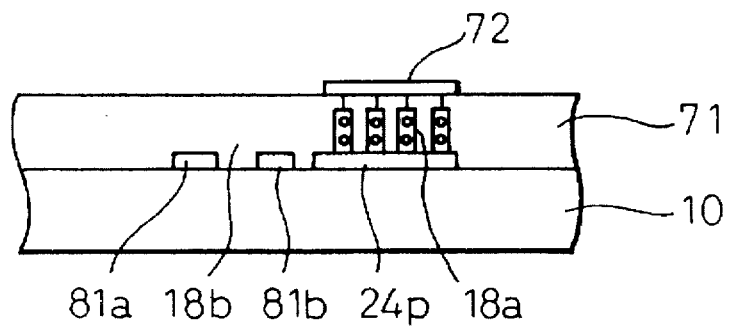
Figure 8A:
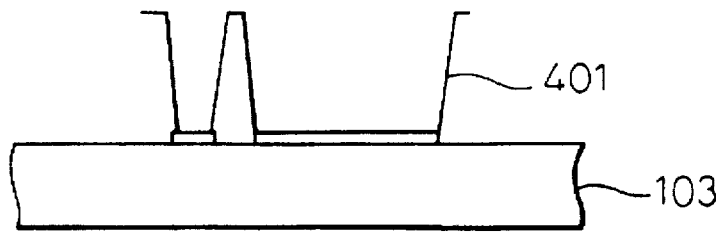
FIGS. 8A to 8D are views illustrating an example of the process for fabricating the liquid crystal display device according to the second embodiment of the present invention.
Figure 8B:
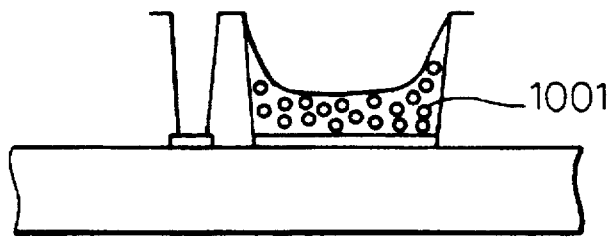
Figure 8C:
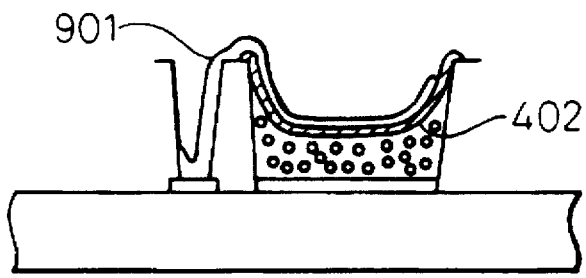
Figure 8D:
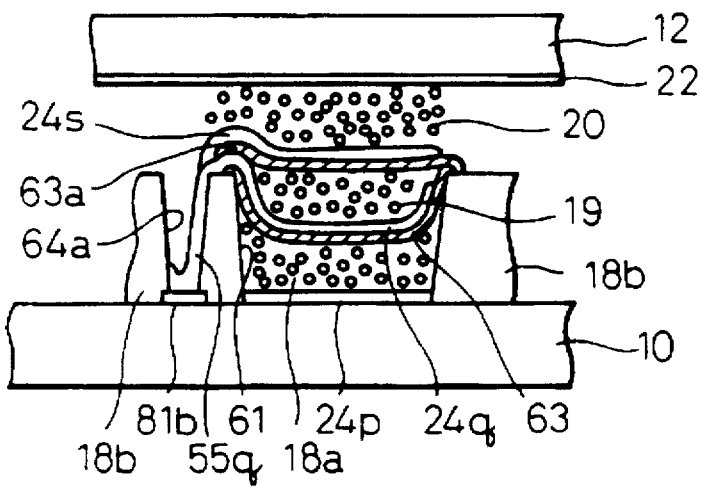
Figure 9:
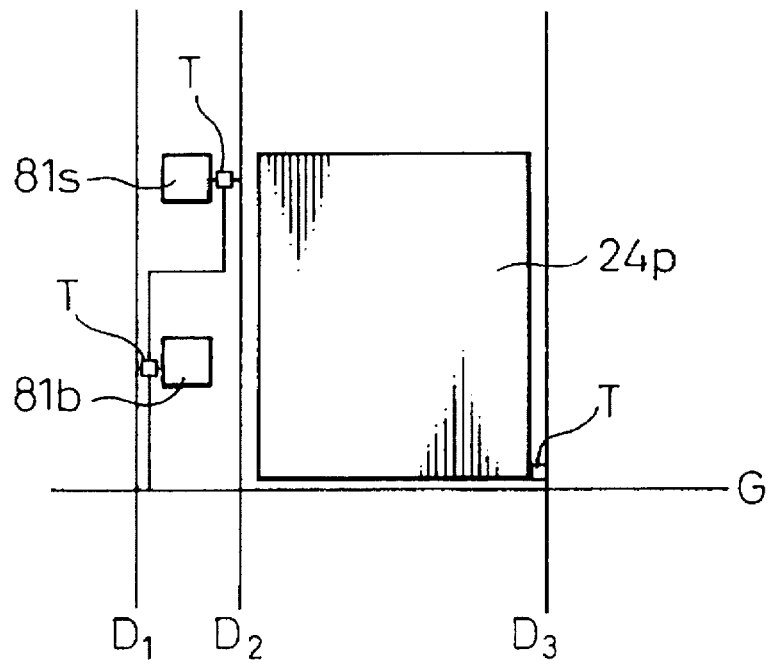
FIG. 9 is a plan view of the electrodes and the active matrix on the first plate of FIGS. 8A to 8D.
Figure 10:
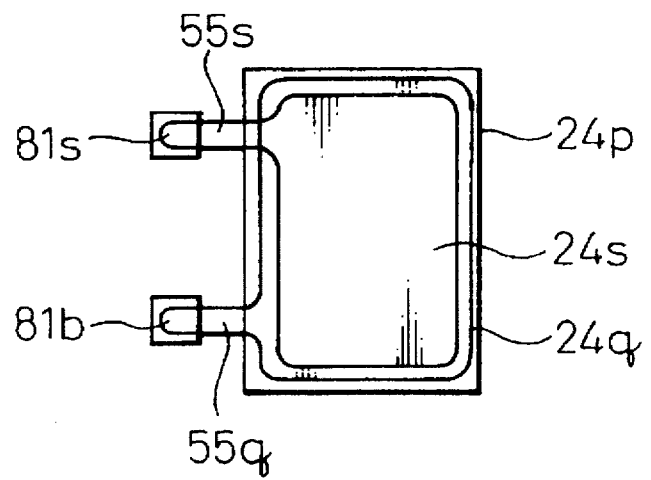
FIG. 10 is a diagrammatic plan view illustrating the arrangement of the electrodes of FIGS. 8A to 8D.

FIGS. 7A to 7C show a further example of the process for fabricating the liquid crystal display device of FIGS. 1 to 3. This example is similar to the example of FIGS. 6A to 6C. This example uses strips 73 of PVA in place of the small particles 70 of PVA in the previous example, and a resist 71 is then coated on the first plate 10 by a spin coater, as shown in FIG. 7A. The strips 73 of PVA are then extracted from the resist 71 to the outside by water or solvent which soaks through the resist 71 to form cavities 71a in the resist 70, as shown in FIG. 7B.

A polymer dispersed liquid crystal is inserted in the cavities 71a of the resist 71 in a vacuum environment, to form the liquid crystal dispersing regions 18a of the first liquid crystal layer 18, as shown in FIG. 7C. At the same time, the solid regions 18b are formed adjacent to the liquid crystal dispersing regions 18a. A passivation layer 72 is arranged on the liquid crystal dispersing regions 18a. Then, the through holes 64 and 65 are formed in the solid regions 18b, the picture electrodes 24r and 24q are formed, and the two plates 10 and 12 are superposed one on another, to complete the liquid crystal display panel, in an identical manner to the process of FIGS. 4E to 4H.

FIGS. 8A to 10 show the second embodiment of the present invention. In this embodiment, a color filter is not provided, but three liquid crystal layers 18, 19 and 20 are provided between a pair of glass plates 10 and 12.

The first plate 10 has picture electrodes 24p and conductors 81a and 81b as well as the active matrix drive circuit, and the first liquid crystal layer 18 located near the first plate 18 has solid regions 18b and liquid crystal dispersing regions 18a, similar to the previous embodiment. The second plate 12 has a common electrode 22.

The liquid crystal dispersing regions 18a of the first liquid crystal layer 18 are inserted in the apertures 61 provided in the solid regions 18b at the height of approximately one half of the height of the apertures 61, and the picture electrodes 24q are arranged on the liquid crystal dispersing regions 18a via the passivation layer 63. The picture electrodes 24q are arranged oppositely to the picture electrodes 24p on the first plate 10 and are connected to the conductors 81b on the first plate 10 by the conductors 55q inserted in the through holes 64a provided in the solid regions 18b.

The intermediate liquid crystal layer 19 includes liquid crystal dispersing regions inserted in the apertures 61 provided in the solid regions 18b on the picture electrodes 24q of the liquid crystal dispersing regions 18a of the first liquid crystal layer 18 at a height approximately corresponding to the height of the apertures 61. Picture electrodes 24s are arranged on the liquid crystal dispersing regions of the intermediate liquid crystal layer 19 via a passivation layer 63a. The picture electrodes 24s are arranged oppositely to the picture electrodes 24q and are connected to conductors 81s on the first plate 10 by the conductors 55s inserted in the through holes provided in the solid regions 18b, in a manner similar to the case of the picture electrodes 24q.

In this case too, three liquid crystal layers 18a, 19 and 20 can be independently controlled to establish a multi-color display. In this case, each of the liquid crystal layers 18a, 19 and 20 have a dichroic dye added thereto, and these liquid crystal layers 18a, 19 and 20 have the color combination of yellow, magenta and cyan or the color combination of red, blue and green. That is, it is possible to establish a multi-color display by the combination of three primary colors.

The reflective picture electrodes 24p can be changed to picture electrodes 24p which are treated to absorb light, and the liquid crystal layers 18a, 19 and 20 include cholesteric liquid crystal materials having selective reflective spectrums of colors selected from the group of red, blue and green, one by one.

In the first and second embodiments, the passivation layer 63 or 63a is used between two liquid crystal layers to prevent the liquid crystal layer from being contaminated due to a flow of the liquid crystal material or the dye from one layer to the adjacent layer. In the present invention, it has been found that such a contamination can be prevented best, if the passivation layer 63 or 63a comprises a polymer formed from a monomer having a plurality of functional groups, that is, vinyl groups. In this case, the monomer is applied to the polymer dispersed liquid crystal constituting one of the liquid crystal layers, and an ultraviolet light is applied to polymerize the monomer to the polymer. Also, it is possible to form the passivation layer 63 or 63a from a conductive polymer.

The polymer, made from a monomer such as tripropylene glycol diacrylate (TPGDA) or neopentyl glycol diacrylate (NPGDA), can provide a thin and highly cross-linking layer, so that it can effectively prevent a flow of a liquid crystal material and a dye. Since TPGDA or NPGDA has a lower viscosity and can be applied as a thin layer, the result is that a loss of voltage is small and the liquid crystal can be driven by a lower voltage.

The structural formula of NPGDA is given below.

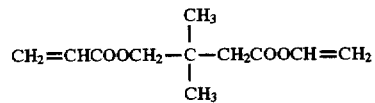

The structural formula of TPGDA is given below.

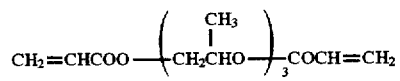

Further, when the monomer is applied to the polymer dispersed liquid crystal as one of the liquid crystal layers, there may be a possibility that the monomer is not uniformly applied if a wettability of the liquid crystal layer is low. In such a case, it is advisable to use TPGDA or NPGDA which is dissolved by a solvent. Propylene glycol monomethylether acethate (PGMEA) is suitable for the solvent used for this purpose.

As explained above in detail, according to the present invention, it is possible to obtain a liquid crystal display panel which comprises at least two liquid crystal layers and an electrode layer between the liquid crystal layers and by which a reliable electric connection can be established.

Also, in the case where the passivation layer comprises a polymer formed from a monomer having a plurality of vinyl groups, it is possible to prevent a flow of a liquid crystal material or a dye therein to thereby obtain a liquid crystal display panel having a good performance.

What is claimed is:

1. A liquid crystal display panel, comprising:
   first and second plates having respective main surfaces in opposing, spaced relationship, the first plate having disposed thereon conductors and electrodes;
   first and second liquid crystal layers arranged between the first and second plates;
   a plurality of solid regions of a non-liquid crystal material on the main surface of the first plate and the first liquid crystal layer being arranged along the first plate as a plurality of separate and discrete liquid crystal dispersing regions disposed between respective, adjacent solid regions;
   electrodes arranged on corresponding surfaces of the liquid crystal dispersing regions in opposed relationship with respect to the electrodes on the first plate; and
   connecting members extending through the solid regions and connecting the electrodes arranged on the liquid crystal dispersing regions to respective conductors on the first plate.

2. A liquid crystal display panel according to claim 1, wherein the second plate has a common electrode disposed on the main surface thereof.

3. A liquid crystal display panel according to claim 1, wherein each of the liquid crystal dispersing regions is surrounded by corresponding, adjacent solid regions.

4. A liquid crystal display panel according to claim 1, wherein a solid region and an adjacent liquid crystal dispersing region correspond to one pixel.

5. A liquid crystal display panel according to claim 1, further comprising a color filter disposed on the main surface of the second plate and including first color portions arranged at positions corresponding to the liquid crystal dispersing regions and second color portions arranged at positions corresponding to the solid regions.

6. A liquid crystal display panel according to claim 5, wherein:
   the first liquid crystal layer comprises a liquid crystal material and a dichroic dye added thereto and having a color selected from the group of yellow, magenta and cyan colors;
   the second liquid crystal layer comprises a liquid crystal material and a dichroic dye added thereto and having a complementary color of the color of the liquid crystal layer near the first plate;
   the color of the first color portions being one of the colors selected from the group of yellow, magenta and cyan colors, except for the color of the liquid crystal layer near the first plate; and
   the color of the second color portions being a complementary color relatively to the color of the first color portions.

7. A liquid crystal display panel according to claim 1, further comprising:
   electrodes arranged on corresponding surfaces of the solid regions remote from the first plate; and
   connecting members extending through the solid regions for connecting the electrodes on the solid regions to respective conductors on the first plate.

8. A liquid crystal display panel according to claim 7, wherein the electrodes on the first plate and the electrodes on the solid regions comprise reflective electrodes.

9. A liquid crystal display panel according to claim 8, wherein the first plate has thin film transistors disposed on the main surface thereof at positions covered by the reflective electrodes on the solid regions.

10. A liquid crystal display panel according to claim 5, wherein:
    the electrodes disposed on the first plate, opposite to the electrodes on the liquid crystal dispersing regions, and the electrodes disposed on the solid regions comprise light absorbing electrodes;
    the first liquid crystal layer comprises a cholesteric liquid crystal material having a selective reflective spectrum of a color selected from the group of red, blue and green;
    the second liquid crystal layer comprises a cholesteric liquid crystal material having a selective reflective spectrum of a complementary color of the color of liquid crystal layer near the first plate;
    the second plate further comprises a color filter including first color portions arranged at positions corresponding to the liquid crystal dispersing regions and second color portions arranged at positions corresponding to the solid regions;
    the color of the first color portions being one of the colors selected from the group of yellow, magenta and cyan colors which allows light of the selective reflective spectrum of the cholesteric liquid crystal material in the liquid crystal layer near the first plate; and
    the color of the second color portions being a complementary color relatively to the color of the first color portions.

11. A liquid crystal display panel according to claim 1 wherein the second liquid crystal layer is disposed adjacent the main surface of the second plate, further comprising spacers inserted in the second liquid crystal layer, selectively arranged at positions corresponding to the solid regions.

12. A liquid crystal display panel according to claim 1, wherein:
    the liquid crystal dispersing regions of the first liquid crystal layer comprise a polymer dispersed type liquid crystal material; and
    the second liquid crystal layer comprises a polymer dispersed type liquid crystal material, the polymer of the second liquid crystal layer material being softer than the polymer of the liquid crystal dispersing regions of the first liquid crystal layer material.

13. A liquid crystal display panel according to claim 1, further comprising:
    a third liquid crystal layer arranged intermediate the first and second liquid crystal layers and comprising separate and discrete liquid crystal dispersing regions respectively corresponding to the liquid crystal dispersing regions of the first liquid crystal layer;
    electrodes arranged on surfaces of the liquid crystal dispersing regions of the third, intermediate liquid crystal layer opposite to the electrodes on the liquid crystal dispersing regions of the first liquid crystal layer;

connecting members extending through the solid regions and connecting the conductors on the first plate to the electrodes on the liquid crystal dispersing regions of the third, intermediate liquid crystal layer; and electrodes arranged on the second plate; opposite to the electrodes on the liquid crystal dispersing regions of the third, intermediate liquid crystal layer and the first liquid crystal layer.

14. A liquid crystal display panel according to, claim 13, wherein each of the first and second liquid crystal layers comprises liquid crystal materials and dichroic dyes added thereto and having the color combination of yellow, magenta and cyan or the color combination of red, blue and green.

15. A liquid crystal display panel according to claim 13, wherein:

the electrodes on the first plate comprise light absorbing electrodes; and the liquid crystal layers comprise cholesteric liquid crystal materials having selective reflective spectrums of colors selected from the group of red, blue and green, one by one.

16. A liquid crystal display panel according to claim 1, further comprising:

a passivation layer arranged between said at least two liquid crystal layers, said passivation layer comprising a polymer formed of a monomer having vinyl groups.

17. A liquid crystal display panel according to claim 16, wherein said passivation layer comprises a polymer formed of one of TPGDA and NPGDA.

18. A liquid crystal display panel according to claim 1, wherein the second liquid crystal layer comprises a continuous liquid crystal layer adjacent the second plate.

19. A liquid crystal display panel, comprising:

a pair of opposing, first and second plates;

first and second liquid crystal layers arranged between the first and second plates, the first liquid crystal layer formed on a main surface of the first plate comprising separate and discrete liquid crystal dispersing regions, each pixel of the display panel comprising at least two respective, immediately adjacent but separate and discrete liquid crystal dispersing regions; and a passivation layer arranged between the first and second liquid crystal layers, said passivation layer comprising a polymer formed of a monomer having a plurality of vinyl groups.

20. A liquid crystal display panel according to claim 19, wherein said passivation layer comprises a polymer formed from a selected one of TPGDA and NPGDA.

21. A liquid crystal display panel according to claim 19, wherein the second liquid crystal layer comprises a continuous liquid crystal layer adjacent the second plate.

* * * * *

UNITED STATES PATENT AND TRADEMARK OFFICE
CERTIFICATE OF CORRECTION

PATENT NO. : 5,724,109
DATED : Mar. 3, 1998
INVENTOR(S) : NAKAMURA et al.

It is certified that error appears in the above-identified patent and that said Letters Patent is hereby corrected as shown below:

Col. 9, line 44 (Claim 5, line 1), change "claim 1" to --claim 4--.

Col. 10, line 15 (Claim 10, line 1), change "claim 5" to --claim 7--.

Signed and Sealed this

Ninth Day of June, 1998

*Attest:*

BRUCE LEHMAN

*Attesting Officer*     *Commissioner of Patents and Trademarks*